United States Patent [19]

Senes et al.

[11] Patent Number: 5,410,969
[45] Date of Patent: May 2, 1995

[54] STEERING DEVICE FOR A VEHICLE BOGEY FITTED WITH WHEELS HAVING PNEUMATIC TIRES

[75] Inventors: René Senes, Merignac; Sylvain Thuet, Roderen, both of France

[73] Assignee: Techlam, Cernay, France

[21] Appl. No.: 103,397

[22] Filed: Aug. 6, 1993

[30] Foreign Application Priority Data

Aug. 11, 1992 [FR] France ................. 92 09913

[51] Int. Cl.⁶ ............................................. B61B 13/00
[52] U.S. Cl. ................................ 105/215.1; 105/72.2; 104/243; 104/247
[58] Field of Search ............... 104/242, 243, 244.1, 104/245, 247, 304, 305; 105/215.1, 215.2, 72.2

[56]  References Cited

U.S. PATENT DOCUMENTS

| 2,718,194 | 9/1955 | Ruhlmann | 104/247 |
| 3,208,400 | 9/1965 | Bingham | 105/215.1 |
| 4,445,440 | 5/1984 | Geiss | 105/215.1 |
| 4,574,707 | 3/1986 | Hickman | 105/215.2 |

FOREIGN PATENT DOCUMENTS

| 0062370 | 10/1982 | European Pat. Off. | |
| 996243 | 12/1951 | France . | |
| 2307693 | 12/1976 | France . | |
| 2623459 | 5/1989 | France | 105/215.2 |
| 1244833 | 7/1967 | Germany | 105/215.2 |
| 3719708 | 12/1988 | Germany | 105/215.2 |

*Primary Examiner*—Mark T. Le
*Attorney, Agent, or Firm*—Weingarten, Schurgin, Cagnebin & Hayes

[57] ABSTRACT

The invention relates to a steering device for a vehicle bogey fitted with wheels having pneumatic tires that run on a pair of runways forming a track along which the vehicle travels. The device comprises a steering caster whose mean plane is parallel or substantially parallel to that of the wheels of the bogey and which is capable of rotating about its own axis when engaging in a guide groove installed between the above-mentioned runways of the track ahead of each branch point. The caster is carried by the frame of the bogey via laminated link blocks that confer to the caster and relative to the bogey a small amplitude degree of freedom in rotation about a vertical axis passing through the center of the caster, and a similarly small amplitude degree of freedom in translation along the axis of the caster, but prevent the caster from moving relative to the bogey in the vertical direction.

15 Claims, 4 Drawing Sheets

STEERING DEVICE FOR A VEHICLE BOGEY FITTED WITH WHEELS HAVING PNEUMATIC TIRES

FIELD OF THE INVENTION

The present invention relates to a steering device for a vehicle bogey fitted with wheels having pneumatic tires that run on a pair of runways forming a track along which the vehicle travels, said device comprising a steering caster whose mean plane is kept parallel or substantially parallel to the planes of the wheels of the bogey and which is capable of rotating about its own axis, engaging in a guide groove formed between the above-mentioned runways of the track ahead of each branch point, said caster being carried by the frame of the bogey via resilient link elements that confer to the caster and relative to the bogey a small-amplitude degree of freedom in rotation about an axis passing through the center of the caster and perpendicular to the plane of the track, and a similarly small-amplitude degree of freedom in translation along the direction of the caster's own axis, but that prevents the caster from moving relative to the bogey in the longitudinal direction of the track or in the direction perpendicular to the plane of the track.

Certain modern urban transport vehicles are fitted with wheels having tires that run on a track comprising no more than two runways and two lateral guide bars. The switching function is provided by the above-mentioned caster which engages in the guiding groove provided at the approach to each branch point. The caster guided by the groove then steers the bogey towards the desired branch of the fork.

In order to ensure that the caster enters the groove and then performs its guiding function under good conditions, it is necessary to interpose a link device between the caster and the bogey to provide the caster with a degree of freedom in rotation about an axis perpendicular to the plane of the track, and a degree of freedom in translation laterally relative to the bogey.

At present, the link device is constituted by means of conventional mechanical elements such as ball bearings, roller bearings, springs, Belleville spring washers, etc. A device made in that way requires periodic greasing and even so it is subject to rapid wear. Furthermore, it is heavy and noisy on going through switches.

SUMMARY OF THE INVENTION

The present invention relates to a steering device for a switching caster whose degrees of freedom are obtained by the fact that its link elements comprise laminated blocks formed by stacks of alternating thin layers of rigid material and of flexible material that are bonded together.

The use of such laminated blocks that are deformable in shear in any direction parallel to the sheets constituted by the above-mentioned alternating layers but that are substantially incompressible perpendicularly to said sheets, provides a simple and elegant solution to the problem of using a caster to steer the bogeys of vehicles having tired running wheels, such steering being required in the branch points of a track that the vehicles are constrained to follow.

More precisely, it is appropriate for the link elements providing the above-mentioned two degrees of freedom to comprise two similar laminated assemblies each constituted by a laminated block or a group of laminated blocks disposed around a circle centered on the axis passing through the center of the caster and perpendicular to the plane of the track, the component layers of the blocks being plane and parallel to the plane of the track, these two assemblies being mounted on either side of a first thrust plate extending parallel to the plane of the track between two second thrust plates parallel to the first plate and secured to each other, the pair of second plates being fixed relative to one of the group constituted by the axis of the caster and the frame of the bogey, while the first plate is fixed relative to the other one of said group.

The configuration of the laminated assemblies makes it possible for them to deform in shear in a plane parallel to the plane of the track (normally horizontal), thereby enabling the caster to move relative to the bogey either by swivelling about a vertical axis or by shifting in a horizontal plane. In contrast, any attempt at vertical shifting or at rotating about an axis parallel to the longitudinal direction of the track is prevented by the high degree of vertical stiffness of the laminated assemblies.

Preferably, the two laminated assemblies are placed with prestress between the two second plates, thereby increasing their vertical stiffness and avoiding possible appearance of traction stresses.

Advantageously, the two laminated assemblies are identical and are disposed in the same way about the center of the caster. It is then appropriate for each laminated assembly to be made up of a plurality of laminated blocks each in the form of a portion of a circular ring, with at least one of the first and second plates being subdivided into distinct portions, each of which is associated with a respective one of said laminated blocks. In a particularly simple embodiment, each assembly is made up of a pair of identical laminated blocks, one being symmetrical to the other about the mean plane of the caster, the laminated blocks of each assembly being disposed on either side of the first plate in coincidence with those of the other assembly.

It will be observed that the flexible link system described above allows the steering caster a degree of freedom in translation along the longitudinal direction of the track. To eliminate this degree of freedom which is not favorable to good operation, provision is made for the link elements further to include a pair of laminated blocks substantially in alignment with the center of the caster in the longitudinal direction of the track, the blocks forming a portion of a circular ring of small angular extent on either side of the midplane of the caster and being made up of cylindrical layers about an axis that is perpendicular to the plane of the track and that passes through the center of the caster, each of these laminated blocks being interposed between two thrust pieces, one fixed relative to the axis of the caster and the other secured to the frame of the bogey. Because of their capacity for deformation in shear, these two laminated blocks (which are preferably disposed symmetrically about the center of the caster and which are advantageously placed under prestress between their thrust pieces in the longitudinal direction of the track) allow the caster to swivel about a vertical axis and to shift laterally. However, their high compression stiffness enables them to prevent any translation movement of the caster in the longitudinal direction.

An optimum quality of bonding for the laminated blocks of the device of the invention is obtained by rubber bonding to the faces of the thrust plates or pieces between which they are interposed. In addition, the dimensions and the characteristics of the laminated blocks are chosen so as to obtain the desired degrees of flexibility for the suspension of the steering caster in the bogey of the vehicle, both in swivelling about the vertical axis and in lateral translation.

The main advantages offered by a device of the invention are as follows:
  no wear, thus long life and reduced maintenance;
  small mass and bulk;
  operating safety because of the way the laminated blocks are disposed, particularly when they are mounted with prestress; and
  reduction in noise on passing going through switches.

BRIEF DESCRIPTION OF THE DRAWINGS

Other features and advantages of the invention appear from the following description of a non-limiting embodiment of the invention given with reference to the accompanying drawings, in which.

MORE DETAILED DESCRIPTION

Figure 1:
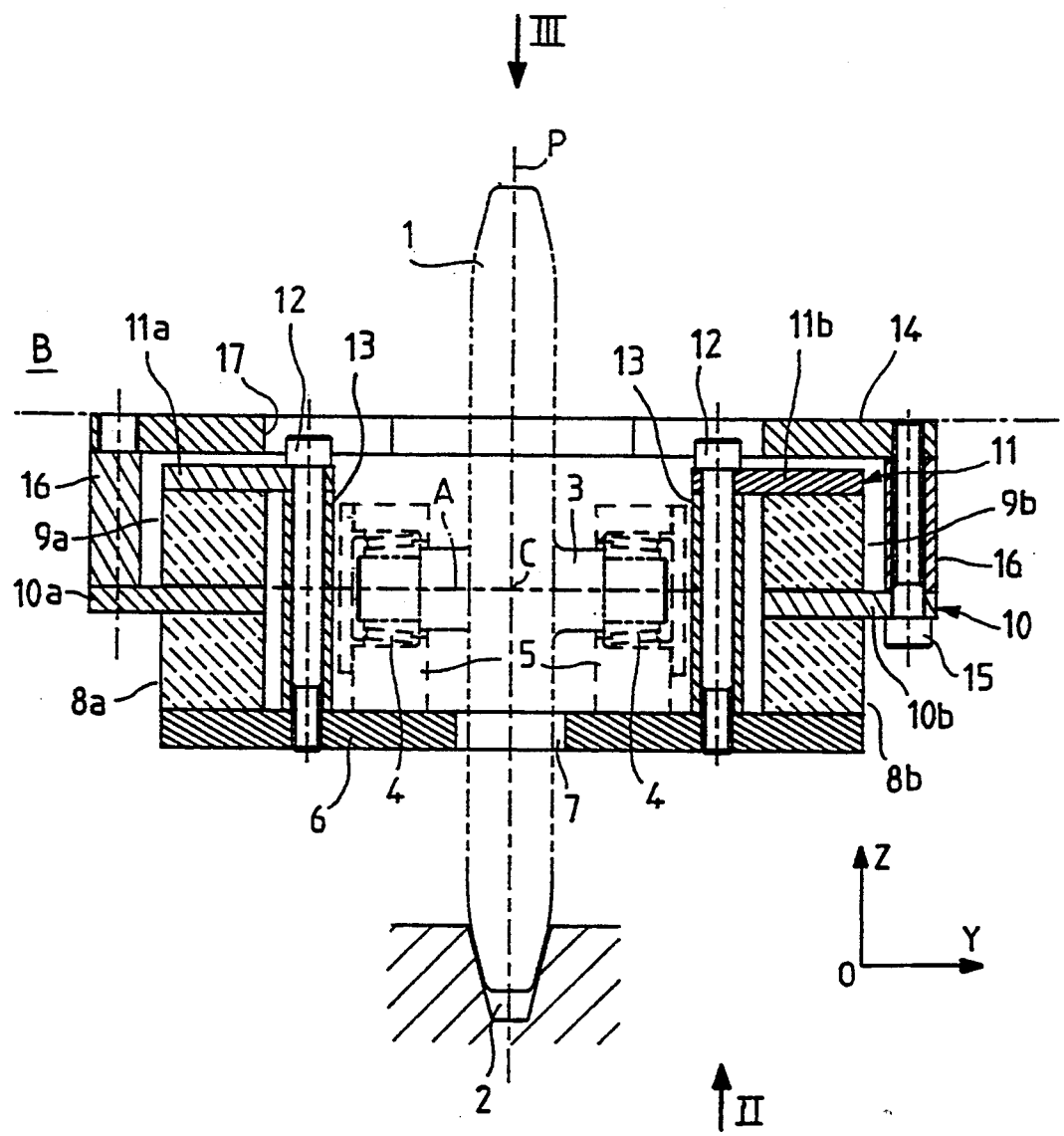
FIG. 1 shows a device of the invention in section on a vertical plane on line I-I of FIG. 3.
Figure 2:
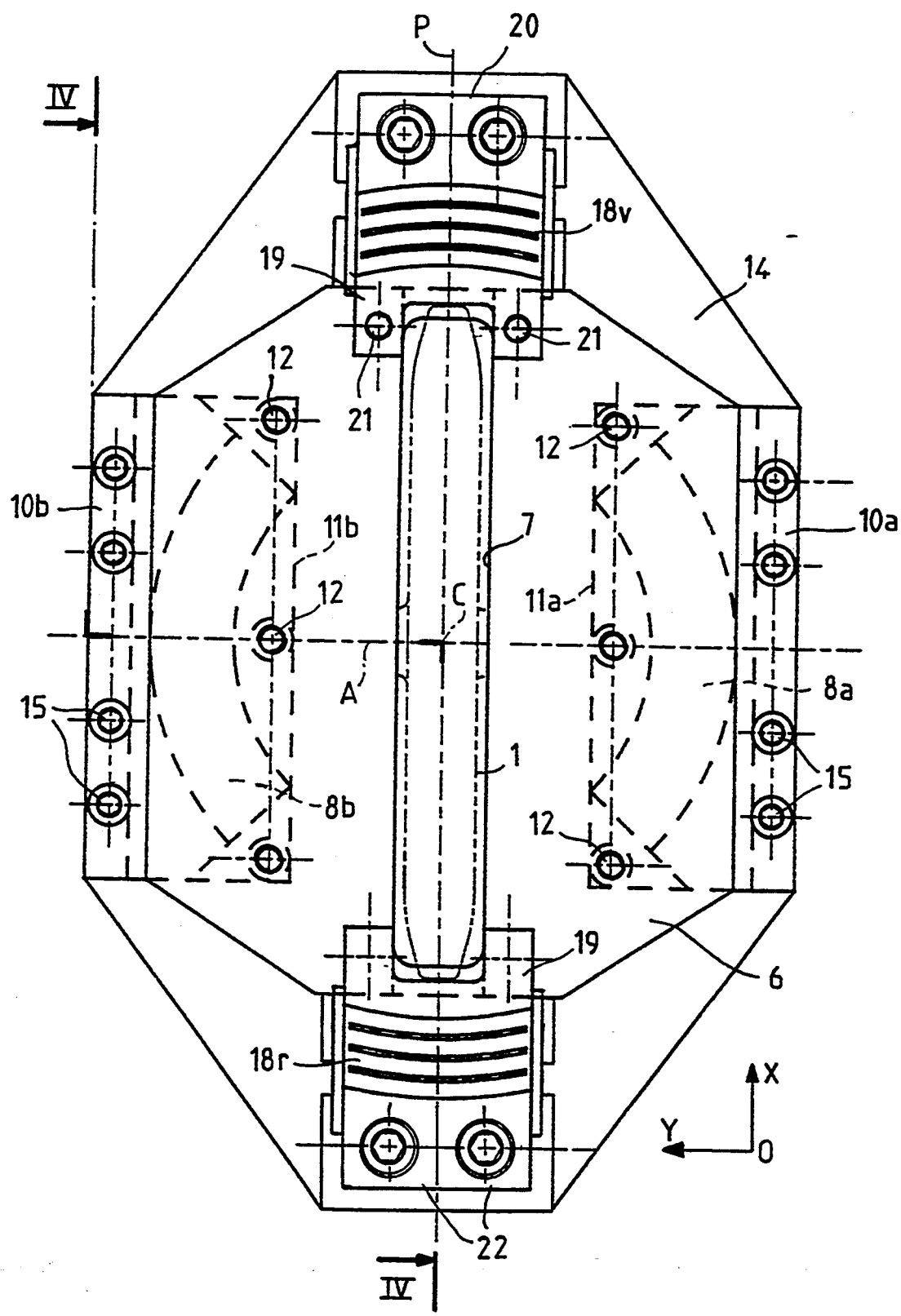
FIG. 2 is a plan view of the device as seen from below, looking along arrow II of FIG. 1.

In the figures, there can be seen a steering caster 1 in the form of a circular disk as provided on each of the bogeys of an urban transport vehicle fitted with wheels having pneumatic tires and running on a track comprising two runways and two lateral guide bars. The caster 1 whose mean plane P is assumed to be vertical since the track itself is assumed to be horizontal engages in a groove 2 disposed on the axis of the track ahead of each branch point. The caster 1 is caused to follow one or other of the branching directions by means of a switch incorporated in the groove 2, and as a result it serves to steer the bogey to which it is fitted about a vertical axis so that the wheels of the bogey continue to travel in the chosen direction.

The caster 1 is secured to the center of a rotary shaft 3 whose axis A is horizontal and parallel to a direction OY perpendicular to the longitudinal direction OX of the runway. This shaft 3 is carried via a pair of roller bearings 4 by means of a pair of supports 5 fixed to the top face of a horizontal plate 6 in which an oblong slot 7 is formed extending in the longitudinal direction, thereby enabling the caster 1 to pass downwards through the plate.

Two pairs of superposed laminated blocks 8a & 9a and 8b & 9b are disposed on the plate 6 symmetrically on either side of the plane P of the caster 1. All of the blocks are identical and each of them comprises alternating horizontal layers of a rigid material (metal sheets) and of a flexible material (sheets of rubber or of elastomer), and its shape in plan has the form of a portion of a circular ring whose axis coincides with the vertical axis passing through the center C of the caster 1. A horizontal plate 10 made up of two distinct elements 10a and 10b is interposed between the blocks of each pair 8a & 9a; 8b & 9b. Each element 10a or 10b is associated with a respective pair of the laminated blocks, thus forming an assembly that is itself sandwiched between the plate 6 and a parallel plate 11 likewise made up of two distinct elements 11a and 11b which are fixed to the plate 6 by screws 12 that cooperate with spacers 13 that set the spacing between the plates 6 and 11. The plane of the intermediate plate 10 includes the center C of the caster 1 or a point very close thereto.

Each of the elements 10a and 10b making up the plate 10 is fixed to a plate 14 that is likewise horizontal and that is situated above the plate 10. This is done by means of screws 15 with interposed spacers 16 that set the spacing between the plates 10 and 14. The plate 14 is provided with a large central opening 17 that serves, in particular, to allow the caster 1 to pass upwards through said plate, and is fixed to the frame B of the bogey.

Two other laminated blocks 18v and 18r are provided on either side of the plate 6 in the longitudinal direction OX, said blocks being similar in structure to the laminated blocks 8a, 8b, 9a and 9b, and likewise forming portions of a circular ring. However, the layers of the blocks 18v and 18r are cylindrical, being disposed about a common vertical axis passing through the center C of the caster. Each of the blocks 18v and 18r is disposed between two thrust pieces 19 and 20, the piece 19 being fixed to one of the longitudinal ends of the plate 6 by means of screws 21, and the piece 20 being fixed to the corresponding longitudinal end of the plate 14 by means of screws 22 and via an intermediate piece 23 secured to the plate 14.

Figure 3:
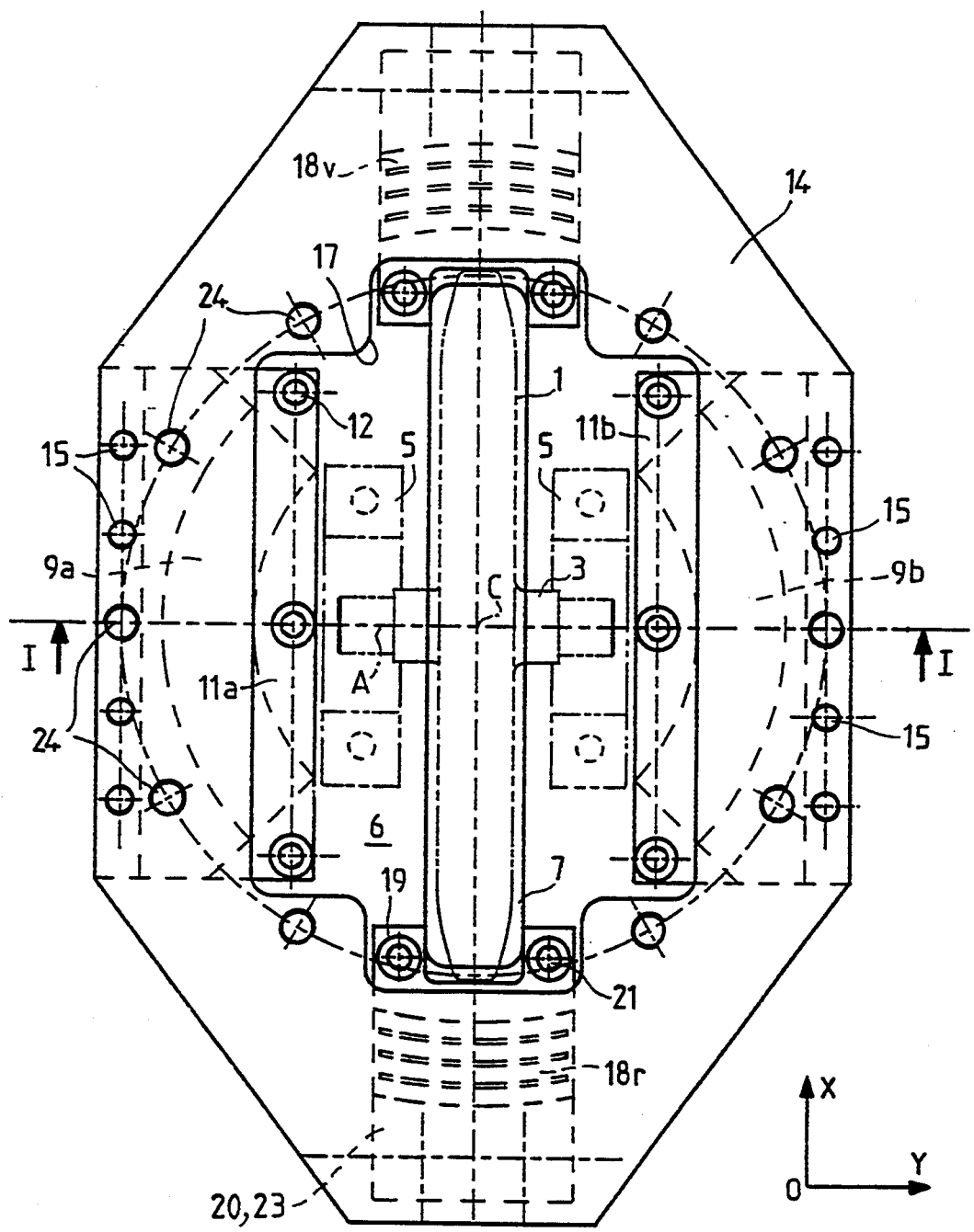
FIG. 3 is a plan of the device as seen from above looking along arrow III of FIG. 1.
Figure 4:
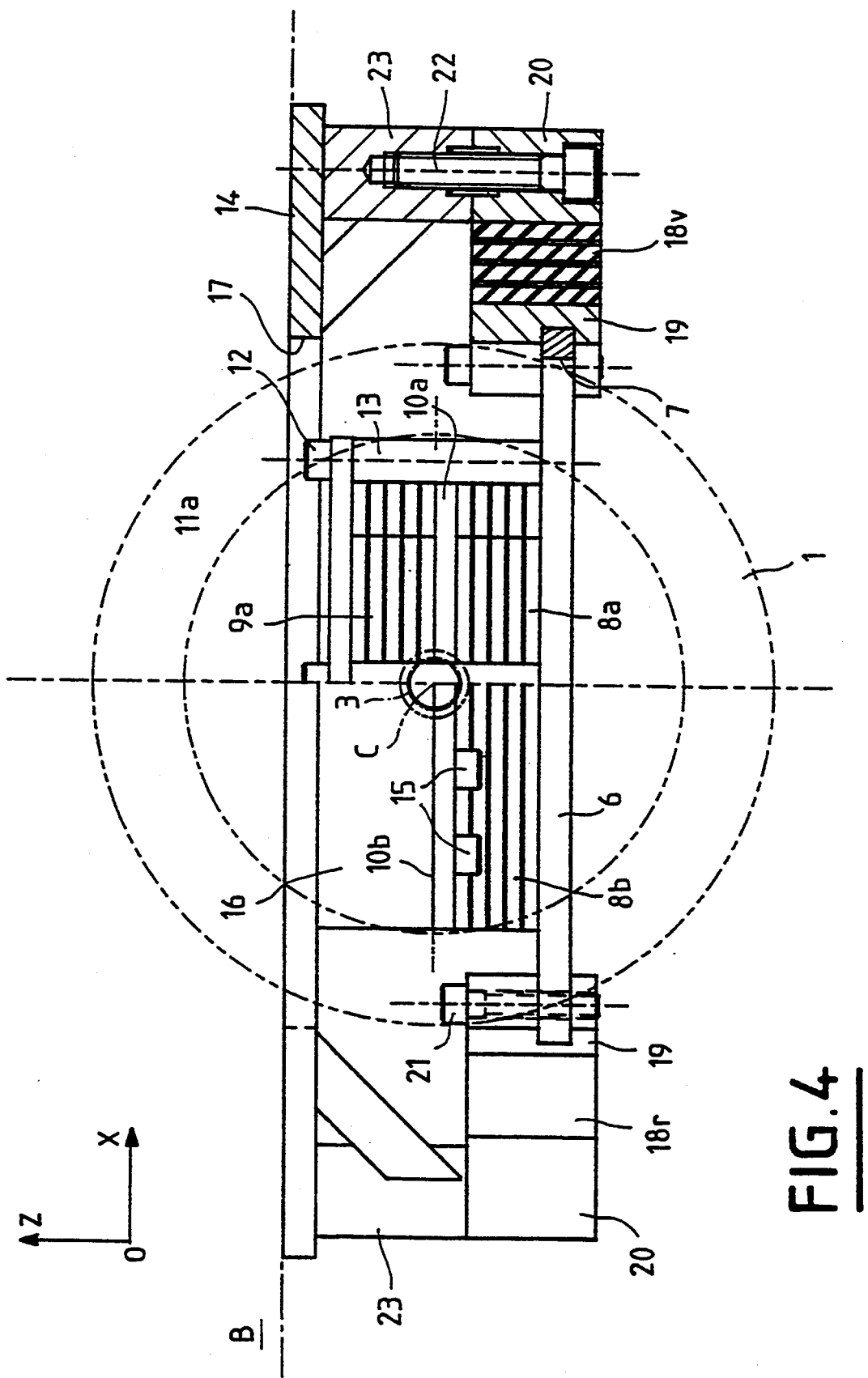
FIG. 4 is a side view of the device in partial section on staggered line IV-IV of FIG. 2.

As can be seen in the figures, the structure of the device described is symmetrical about the plane P of the caster 1 and also about a plane perpendicular to said plane and including the center C of the caster. The device is fixed beneath the frame B of the corresponding bogey by means of screws received in holes 24 formed in the top plate 14 and regularly distributed around a ring centered on the vertical axis passing through the center C of the caster (FIG. 3).

When they deform in shear, the laminated blocks that provide the suspension of the caster 1 relative to the plate 14, and consequently relative to the bogey, allow the caster to swivel about the vertical axis passing through its center C and also to move in translation along the direction OY that extends transversely relative to the track. The laminated blocks 18v and 18r do not oppose these translation movements, given the small amount of curvature of their component layers and given their small angular extent about said vertical axis associated with their relatively great distance therefrom. In contrast, they prevent the caster from moving in translation along the longitudinal direction OX of the track, since they are incompressible in that direction. Similarly, the laminated blocks 8a, 8b, 9a, and 9b whose layers extend horizontally oppose any vertical displacement of the caster 1 relative to the bogey.

Like the pairs of blocks 8a & 9a; 9a & 9b, the pair of blocks 18v & 18r may be placed under prestress by urging towards each other the end thrust pieces 20 situated on opposite sides of said blocks and of the plate 6 that is interposed between them.

We claim:

1. A steering device for a vehicle bogey fitted with wheels having pneumatic tires that run on a pair of runways forming a track along which the vehicle travels, the track defining a travel axis, said device comprising:
  a steering caster whose mean plane is substantially parallel to planes defined by the wheels of the bogey and which is capable of rotating about a caster axis orthogonal to the caster mean plane and passing through the center of the caster, said caster engaging in a guide groove formed between the runways of the track preceding a track branch point, said caster being carried by a frame of the body via resilient link elements; and said resilient link elements comprise laminated blocks formed by stacks of alternating bonded layers of rigid material and of flexible material, said resilient link elements disposed on a frame of said vehicle bogey and conferring to the caster and relative to the bogey:

a first degree of freedom in rotation about a first axis passing through a center of the caster and perpendicular to a plane defined by the track, a first degree of freedom in translation parallel to the caster axis, resistance to caster motion relative to the bogey in a longitudinal direction of the travel axis, and resistance to caster motion relative to the bogey in a direction perpendicular to the plane of the track.

2. A device according to claim 1, wherein each of the link elements providing the above-mentioned degrees of freedom comprise two similar laminated assemblies each constituted by at least one laminated block disposed around a circle centered on the first axis passing through the center of the caster and perpendicular to the plane of the track, the component layers of the at least one block being planar and parallel to the plane of the track, these two assemblies being mounted on either side of a first thrust plate extending parallel to the plane of the track and between two second thrust plates parallel to the first plate and secured to each other.

3. A device according to claim 2, wherein the two laminated assemblies are prestressed between the two second plates.

4. A device according to claim 2, wherein the two laminated assemblies are identical and are equidistantly disposed about the first axis.

5. A device according to claim 4, wherein each laminated assembly is made up of a plurality of coplanar laminated blocks each in the form of a portion of a circular ring, with at least one of the first and second plates being subdivided into distinct portions, each of which is associated with a respective one of said laminated blocks.

6. A device according to claim 5, wherein each assembly is made up of a pair of identical laminated blocks, one being symmetrical to the other about the mean plane of the caster, the laminated blocks of each assembly being disposed on either side of the first plate in coincidence with those of the other assembly.

7. A device according to claim 1, wherein the link elements further include a secondary pair of laminated blocks substantially in alignment with the center of the caster along the travel axis, the blocks forming a portion of a circular ring of small angular extend on either side of the first axis and made up of cylindrical layers centered about the first axis, each of these secondary laminated blocks interposed between first and second thrust pieces.

8. A device according to claim 7, wherein the two laminated blocks forming said secondary pair are disposed symmetrically about the first axis.

9. A device according to claim 7, wherein the two laminated blocks forming said secondary pair are prestressed between said thrust pieces along the travel axis.

10. A device according to claim 6, wherein each of the laminated blocks is bonded to the faces of the plates between which it is interposed.

11. A device according to claim 7, wherein each of the secondary laminated blocks is bonded to the faces of the thrust pieces between which it is interposed.

12. The device according to claim 7 wherein said first thrust piece is fixed with respect to said caster axis and said second thrust piece is fixed with respect to said vehicle bogey frame.

13. The device according to claim 7 wherein said first thrust piece is fixed with respect to said vehicle bogey frame and said second thrust piece is fixed with respect to said caster axis.

14. The device according to claim 2 wherein said first thrust plate is fixed to said vehicle bogey frame and said second thrust plates are fixed to said caster axis.

15. The device according to claim 2 wherein said first thrust plate is fixed to said caster axis and said second thrust plates are fixed to said vehicle bogey frame.

* * * * *

UNITED STATES PATENT AND TRADEMARK OFFICE
CERTIFICATE OF CORRECTION

PATENT NO. : 5,410,969
DATED : May 2, 1995
INVENTOR(S) : Rene Senes et al.

It is certified that error appears in the above-indentified patent and that said Letters Patent is hereby corrected as shown below:

On the Cover Page before the ABSTRACT,

"Attorney, Agent, or Firm--Weingarten, Schurgin, Cagnebin & Hayes"

should read

--Attorney, Agent, or Firm--Weingarten, Schurgin, Gagnebin & Hayes--.

Signed and Sealed this

Fifth Day of March, 1996

Attest:

BRUCE LEHMAN

Attesting Officer

Commissioner of Patents and Trademarks